(12) United States Patent
Higashi (10) Patent No.: US 10,964,188 B2
(45) Date of Patent: Mar. 30, 2021

(54) MISSING CHILD PREVENTION SUPPORT SYSTEM

(71) Applicant: Honda Motor Co., Ltd., Tokyo (JP)

(72) Inventor: Haruomi Higashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/807,182

(22) Filed: Mar. 3, 2020

(65) Prior Publication Data

US 2020/0286356 A1 Sep. 10, 2020

(30) Foreign Application Priority Data

Mar. 8, 2019 (JP) .............................. JP2019-042592

(51) Int. Cl.
*G08B 21/02* (2006.01)
*G08B 21/22* (2006.01)
(Continued)

(52) U.S. Cl.
CPC ..... *G08B 21/0263* (2013.01); *G06K 9/00771* (2013.01); *G08B 21/0294* (2013.01);
(Continued)

(58) Field of Classification Search
CPC .. A63F 2300/1087; A63F 13/00; A63F 13/02; A63F 13/04; A63F 13/06; A63F 13/10; A63F 13/213; A63F 13/245; A63F 2300/1043; A63F 2300/1062; A63F 2300/1075; A63F 2300/1081; A63F 2300/1093; A63F 2300/6045; A63F 2300/69; A63F 2300/1012; G06F 3/011; G06F 3/017; G06F 3/0325; G06F 3/042; G06F 3/0425; G06F 19/3418; G06F 3/0304; G06F 3/0346; G06F 3/038; G06F 3/0428; G06F 17/00; G06F 2203/0331; G06F 16/71; G08B 21/0263; G08B 13/1427;
(Continued)

(56) References Cited

U.S. PATENT DOCUMENTS 7,042,440 B2 * 5/2006 Pryor ........................ G06T 7/73
345/158
2009/0085873 A1 * 4/2009 Betts .................. G08B 21/0275
345/169
(Continued)

FOREIGN PATENT DOCUMENTS

JP 2018132803 8/2018

*Primary Examiner* — Daniel Previl
(74) *Attorney, Agent, or Firm* — JCIPRNET (57) ABSTRACT

A missing child prevention support system is provided and includes: a grouping part configured to recognize a group of users who are facility users entering a facility and generate user group information indicating a user group; an image acquisition part configured to acquire facility images including images of the users from imaging devices of the facility; a guide control part configured to control an operation of a movable guiding device performing guiding for the users in the facility; a guide grouping specifying part configured to specify the user group of the users for which the guiding device performs the guiding; and a missing child estimation part configured to estimate an unguided user who is a user not belonging to the user group as a potential missing child when the unguided user is shown in the facility images.

8 Claims, 4 Drawing Sheets

(51) Int. Cl.
*G06K 9/00* (2006.01)
*H04W 4/024* (2018.01)
*H04W 4/33* (2018.01)
*G10L 15/08* (2006.01)
*G08B 21/24* (2006.01)

(52) U.S. Cl.
CPC .............. *G08B 21/22* (2013.01); *G08B 21/24* (2013.01); *G10L 15/08* (2013.01); *H04W 4/024* (2018.02); *H04W 4/33* (2018.02)

(58) Field of Classification Search
CPC ................ G08B 17/00; G08B 21/0275; G08B 21/0286; G08B 21/0415; G08B 21/043; G08B 21/0446; G08B 21/088; G08B 21/12; G08B 25/009; G08B 25/016; G08B 29/181; G08B 21/24; G08B 13/19645; G08B 13/19656; G08B 13/16982; G08B 21/0294; G08B 21/22; G01N 33/0075; G06K 7/10366; G06K 9/00335; G06K 9/00771; G10L 17/06; G10L 17/26; G10L 15/08; H04M 1/026; H04M 1/7253; H04M 1/72569; H04M 2250/10; H04M 2250/12; H04R 2430/20; H04R 3/005; G01S 5/16; G06T 19/20; G06T 2219/2016; G06T 2219/2021; G06T 7/73; G10H 1/0008; G10H 2220/321; G16H 40/63; G16H 40/67; G16H 50/50; H04L 67/12; H04L 67/306; H04W 4/024; H04W 4/029; H04W 4/33; H04W 4/80; H04W 4/90; H04W 8/22
USPC .... 340/539.13, 540, 539.15, 539.22, 539.26, 340/568.1, 571, 691.6, 825.28
See application file for complete search history.

(56) References Cited

U.S. PATENT DOCUMENTS

| | | | | |
|---|---|---|---|---|
| 2014/0167957 | A1* | 6/2014 | Tsuji | H04W 8/22 340/539.13 |
| 2014/0329486 | A1* | 11/2014 | Choi | H04W 4/90 455/404.1 |
| 2015/0336667 | A1* | 11/2015 | Srivastava | G05D 1/1064 701/2 |
| 2017/0177925 | A1* | 6/2017 | Volkart | B64C 39/024 |
| 2017/0235793 | A1* | 8/2017 | Hamada | G06F 16/2455 707/738 |
| 2020/0097734 | A1* | 3/2020 | Miyake | H04W 4/029 |
| 2020/0134352 | A1* | 4/2020 | Choi | G06T 7/30 |
| 2020/0257909 | A1* | 8/2020 | Korman | G06K 9/00812 |

* cited by examiner

| group identification ID | guide flag | user list | | | |
|---|---|---|---|---|---|
| | | user 1 | user 2 | user 3 | user 4 |
| GRP001 | 1 | user0001 adr0001 | user0002 adr0002 | user0003 adr0003 | |
| GRP002 | 1 | user1001 adr1001 | user1002 adr1002 | user1003 adr1003 | user1004 adr1004 |
| GRP003 | 0 | user2001 adr2001 | user2002 adr2002 | user2003 adr2003 | user2004 adr2004 |
| GRP004 | 0 | user3001 adr3001 | user3002 adr3002 | user3003 adr3003 | |
| : | : | : | : | : | : |

MISSING CHILD PREVENTION SUPPORT SYSTEM

CROSS REFERENCE TO RELATED APPLICATIONS

This application claims the priority benefit of Japanese Patent Application No. 2019-042592, filed on Mar. 8, 2019. The entirety of the above-mentioned patent application is hereby incorporated by reference herein and made a part of this specification.

BACKGROUND

Technical Field

The disclosure relates to a missing child prevention support system performing support so that a child does not go missing in a facility such as a shopping mall, a station, an airport, or a hotel.

Description of Related Art

In the related art, a person detection system in which children acting alone and their position are specified from image information of surveillance cameras and the children are specified as missing children based on appearance characteristics or the like of the children extracted from the image information is known (see Patent Document 1, i.e., Japanese Patent Laid-Open No. 2018-132803). Further, in this system, groups of persons are determined based on action information extracted from image information of surveillance cameras and other people of the same groups of persons of the children are specified as guardians of the children. Then, by specifying positions of the guardians from the image information of the surveillance cameras, it is possible to facilitate returning the missing children and the guardians.

In the person detection system of the related art, however, it is necessary to set all the images from all the surveillance cameras as targets, extract all the persons shown in the images, and extract appearance characteristics, action information, or the like, and thus a processing load of the system becomes considerable. In addition, in the person detection system of the related art, to track an action accompanied by acquisition of action information, it may be necessary to install many surveillance cameras.

SUMMARY

The disclosure is devised in view of the foregoing circumstances and is to efficiently detect persons who are likely to be missing children and support prevention of children becoming missing while reducing a processing load of image processing or the like.

According to an embodiment of the disclosure, there is provided a missing child prevention support system including: a grouping part configured to recognize a group of users who are facility users entering a facility and generate user group information indicating a user group; an image acquisition part configured to acquire facility images including images of the users from imaging devices of the facility; a guide control part configured to control an operation of a movable guiding device performing guiding for the users in the facility; a guide grouping specifying part configured to specify the user group of the users for which the guiding device performs the guiding; and a missing child estimation part configured to estimate an unguided user who is a user not belonging to the user group as a potential missing child when the unguided user is shown in the facility images.

According to another embodiment of the disclosure, the imaging devices may include an imaging device with which the guiding device is equipped.

According to still another embodiment of the disclosure, the grouping part may generate the user group information based on talk analysis of talk voices with the users acquired from a reception device talking with the users entering the facility and talk analysis of talk voices between the guiding device and the users acquired from the guiding device.

According to still another embodiment of the disclosure, the missing child prevention support system may further include an alert operation part configured to specify a position of the unguided user who is estimated as the potential missing child based on the facility images or positions of the imaging devices imaging the unguided user and perform an alert operation in accordance with the specified position.

According to the disclosure, it is possible to efficiently detect persons who are likely to be missing children and support prevention of children becoming missing while reducing a processing load of image processing or the like.

DESCRIPTION OF THE EMBODIMENTS

Figure 1:
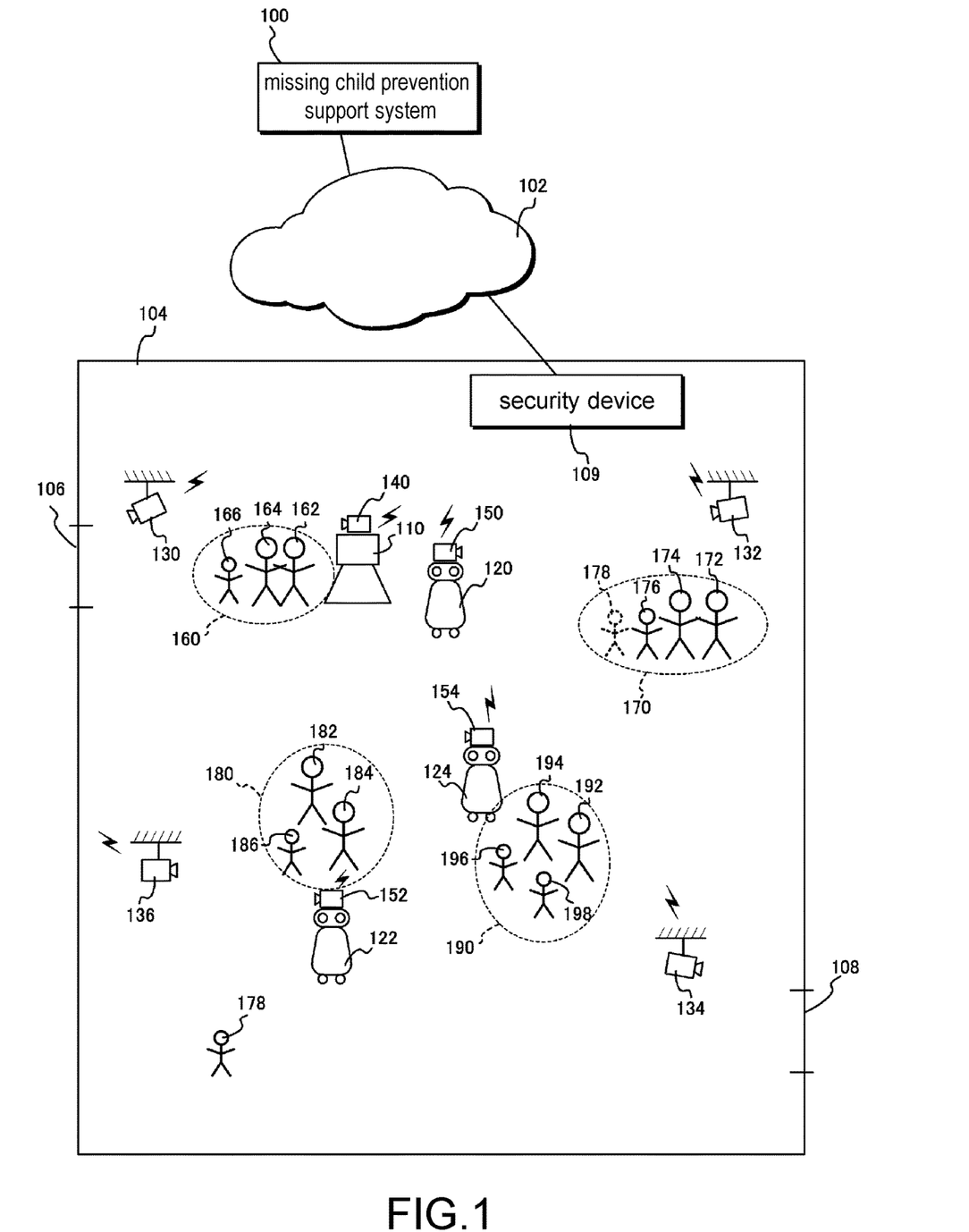
FIG. 1 is a diagram illustrating an example of a scenario in which a missing child prevention support system according to an embodiment of the disclosure is used.

Hereinafter, an embodiment of the disclosure will be described with reference to the drawings. FIG. 1 is a diagram illustrating an example of a scenario in which a missing child prevention support system 100 according to an embodiment of the disclosure is used. The missing child prevention support system 100 according to the embodiment finds potential missing children in a facility 104 which is, for example, a hotel to support prevention of occurrence of missing children.

The facility 104 has a reception device 110 that accepts facility entrance of facility users such as guests (hereinafter users) entering from a main entrance 106 of the facility 104. The reception device 110 includes, for example, a speaker and a microphone to talk with the users and checks, for example, an accommodation reservation and accepts entrance reception of users.

In the facility 104, for example, movable guiding devices 120, 122, and 124 (collectively referred to as guiding device 120 and the like) that perform guiding in the facility 104 for users in the facility 104 are disposed. The guiding device 120 and the like are, for example, guiding robots, including, for example, speakers and microphones, and can talk with users.

In the facility 104, further, imaging devices 130, 132, 134, and 136 (collectively referred to as imaging devices 130 and the like) capturing images in the facility 104 (hereinafter referred to as facility images) including images of the users are provided. In the reception device 110, an imaging device 140 capturing facility images including images of the users is provided. Further, in the guiding devices 120, 122, and 124, imaging devices 150, 152, and 154 (collectively referred to as imaging devices 150 and the like) capturing facility images including images of the user are also provided.

In the embodiment, the missing child prevention support system 100 is configured as, for example, one device such as a server and, for example, is connected to be able to communicate with a security device 109 provided in the facility 104 via a network 102 which is the Internet. The security device 109 notifies, for example, a security manager, a staff member, or the like of the facility 104 of information received from the missing child prevention support system 100.

The missing child prevention support system 100 is connected indirectly via the security device 109 and/or the network 102 or directly without the involvement of the security device 109 and the network 102 to be able to communicate with the reception device 110, the guiding devices 120, 122, and 124, and the imaging devices 130, 132, 134, 136, 140, 150, 152, 154, and 156.

Here, operations of the reception device 110, the guiding device 120, and the like are controlled by, for example, the missing child prevention support system 100.

The missing child prevention support system 100 recognizes groups of users who are facility users entering the facility 104 and generates user group records which are user group information indicating the user groups. Here, the groups of users mutually have a predetermined relationship, refer to an association of users who normally act as a party, and can be, for example, a group such as a family, a traveler group, a friend group, or a personnel group.

The user group record which is user group information includes a list of users who form the user group. The list of the users can include facial images of corresponding users and identification information (for example, names, ages, and the like).

The missing child prevention support system 100 controls, for example, the reception device 110 such that the reception device 100 talks with users entering the facility 104, recognizes a group of users based on talk analysis of talk voices with the users performed by the reception device 110, and generates a user group record of the user group. For example, the missing child prevention support system 100 performs talking such as "You accompany aa. May I have your name?" and "Are there other companions?" while exchanging greetings with one of the users, groups the users, and generates a user group record including a list of the users of the user group. The missing child prevention support system 100 may cause the guiding devices 120, 122, and 124 to talk with the users instead of or in addition to the reception device 110, group the users based on analysis of the talk, and generate the user group record.

In the example of FIG. 1, in the facility 104, there are users 162, 164, 166, 168, 172, 174, 176, 178, 182, 184, 186, 192, 194, 196, and 198 (collectively referred to as the user 162 and the like). In the example of FIG. 1, the user group is, for example, a family.

In FIG. 1, the missing child prevention support system 100 recognizes the users 162, 164, and 166 as a user group 160 from, for example, the talk between the user 162 and the reception device 110. In the example of FIG. 1, the missing child prevention support system 100 recognizes the users 172, 174, 176, and 178 as a user group 170, recognizes the users 182, 184, and 186 as a user group 180, and recognizes the users 192, 194, 196, and 198 as a user group 190 as a user group 190 beforehand. The user 178 who is a member of the user groups 170 is acting away from the other members to a position of a lower left of the drawing. In FIG. 1, to indicate that the user 178 is a member of the user group 170, the user 178 is indicated by a dotted line in a dotted ellipse indicating the user group 170.

The missing child prevention support system 100 generates and stores a user group record including a user list including facial images of the user 162 and the like who are members of each user group 160 and the like as user group information with regard to each of the user groups 160, 170, 180, and 190 (collectively referred to as the user group 160 and the like). The missing child prevention support system 100 acquires the facial images of the user 162 and the like from, for example, the imaging device 140, 150, or the like included in the reception device 110, the guiding device 120, or the like used for talking at the time of grouping of the users.

Thereafter, the missing child prevention support system 100 instructs the guiding device 120 and the like to perform necessary guiding in response to reception of guiding requests in talks from the user 162 and the like such as "Where is bb restaurant?," for example, via the reception device 100 and the guiding device 120 and the like via the reception device 110 and the guiding device 120 and the like. The missing child prevention support system 100 specifies the user group 160 and the like guided by the guiding device 120 and the like based on, for example, images in the facility 104 (facility images) acquired from the imaging device 150 and the like included in the guiding device 120 and the like, the imaging device 140 included in the reception device 110, and/or the imaging device 130 and the like disposed in the facility 104.

When unguided users who are users not belonging to the user groups guided by the guiding device 120 and the like are shown in the facility images, the missing child prevention support system 100 estimates the unguided users as potential missing children.

Further, the missing child prevention support system 100 specifies the positions of the unguided users estimated as the potential missing children from the facility images or the positions of the imaging devices 130, 140, 150, and the like imaging the unguided users. Then, the missing child prevention support system 100 performs an alert operation in accordance with the specified positions.

In the example of FIG. 1, the missing child prevention support system 100 specifies the guiding devices 122 and 124 are guiding the user groups 180 and 190, respectively, from the facility images acquired from the imaging devices 130, 140, 150, and the like. In the example of FIG. 1, the missing child prevention support system 100 recognizes that the user 178 who does not belong to any of the user groups 180 and 190 guided by the guiding devices 122 and 124 is shown in, for example, the facility image from the imaging device 136 disposed in the facility 104 or the facility image from the imaging device 152 installed in the guiding device 122.

The missing child prevention support system 100 recognizes the user 178 as an unguided user and estimates the user 178 as a potential missing child. Here, the reason why the unguided user who does not belong to any of the guided user groups is estimated as a missing child is that a user who is missing from the guided user group is highly likely to have left the guiding intentionally and be acting separately and a user who is acting alone or a small number of users and the like who are acting in an unguided user group are highly likely to be missing children.

The missing child prevention support system 100 specifies the position of the user 178 who is an unguided user estimated as a potential missing child based on, for example, the position of the imaging device 136 or 152 acquiring the facility image in which the user 178 is shown. The disposition positions of the imaging device 130 and the like in the facility 104 including the disposition position of the imaging device 136 can be stored in advance in the missing child prevention support system 100. The position of the imaging device 152 can be specified from a current position of the guiding device 122 on which the imaging device 152 is mounted. For example, current positions of the guiding device 120 and the like including the current position of the guiding device 122 can be specified from strengths of radio waves transmitted from signal transmission devices (not illustrated) distributed and disposed in the facility 104 and received in the guiding device 120 and the like according to a technology of the related art.

The missing child prevention support system 100 performs an alert operation in accordance with the specified position of the user 178 estimated as the potential missing child. For example, the missing child prevention support system 100 sets an alert level for the user 178 in accordance with the specified position and outputs alert information including information regarding the alert level to the security device 109 of the facility 104 via the network 102.

The alert information can include, for example, information indicating the position of the user 178, a facial image, and/or a name or the like which is identification information. The alert level can be set to, for example, three stages. For example, when the specified position is within an area with good visibility (for example, a lobby of a hotel or the like) in the facility 104, alert level 1 can be set. When the specified position is within an area with poor visibility (for example, a store or the like in which there are many displayed items and there are many blind spots), alert level 2 can be set. When the specified position is within a range of a predetermined distance from an entrance door 108 in which a user is likely to go out from the facility 104, alert level 3 can be set.

In the example of FIG. 1, the missing child prevention support system 100 sets the user 178 to alert level 1 since the position of the user 178 estimated as a potential missing child is in, for example, a lobby of the facility 104 which is a hotel and is an area with good visibility. Then, the missing child prevention support system 100 outputs the alert information for the user 178 who is an unguided user estimated as the potential missing child, including information indicating the set alert level 1 to the security device 109.

Thus, for example, a staff member or security staff member of the facility 104 can recognize the position of the user 178 and search for the user 178 and can take necessary measures such as contacting the other user 172, 174, or 176 belonging to the user group 170 in response to acquisition of the alert information for the user 178 via the security device 109.

The missing child prevention support system 100 that has the foregoing configuration specifies and stores the user group 160 and the like of the user 162 and the like in the facility 104. Then, the missing child prevention support system 100 estimates the user 178 who is an unguided user belonging to the user group 170 not guided by the guiding device 120 or the like as a potential missing child and performs an alert operation. That is, since the missing child prevention support system 100 determines a potential missing child only on the basis of whether an unguided user is recognized in images of the facility 104 acquired from the imaging devices 130, 140, 150, and the like without tracking all the user 162 and the like so that a potential missing child can be searched for, it is possible to efficiently detect a person who is likely to be a missing child while considerably reducing a processing load for detecting a missing child. Since the above-described missing child prevention support system 100 acquires the facility images using the imaging device 150 and the like provided in the guiding device 120 and the like which can move in the facility 104, for example, the imaging device 152 and the like of the guiding device 122 which is guiding one user group 180, it is possible to efficiently detect a potential missing child while reducing a necessary number of surveillance cameras.

Figure 2:
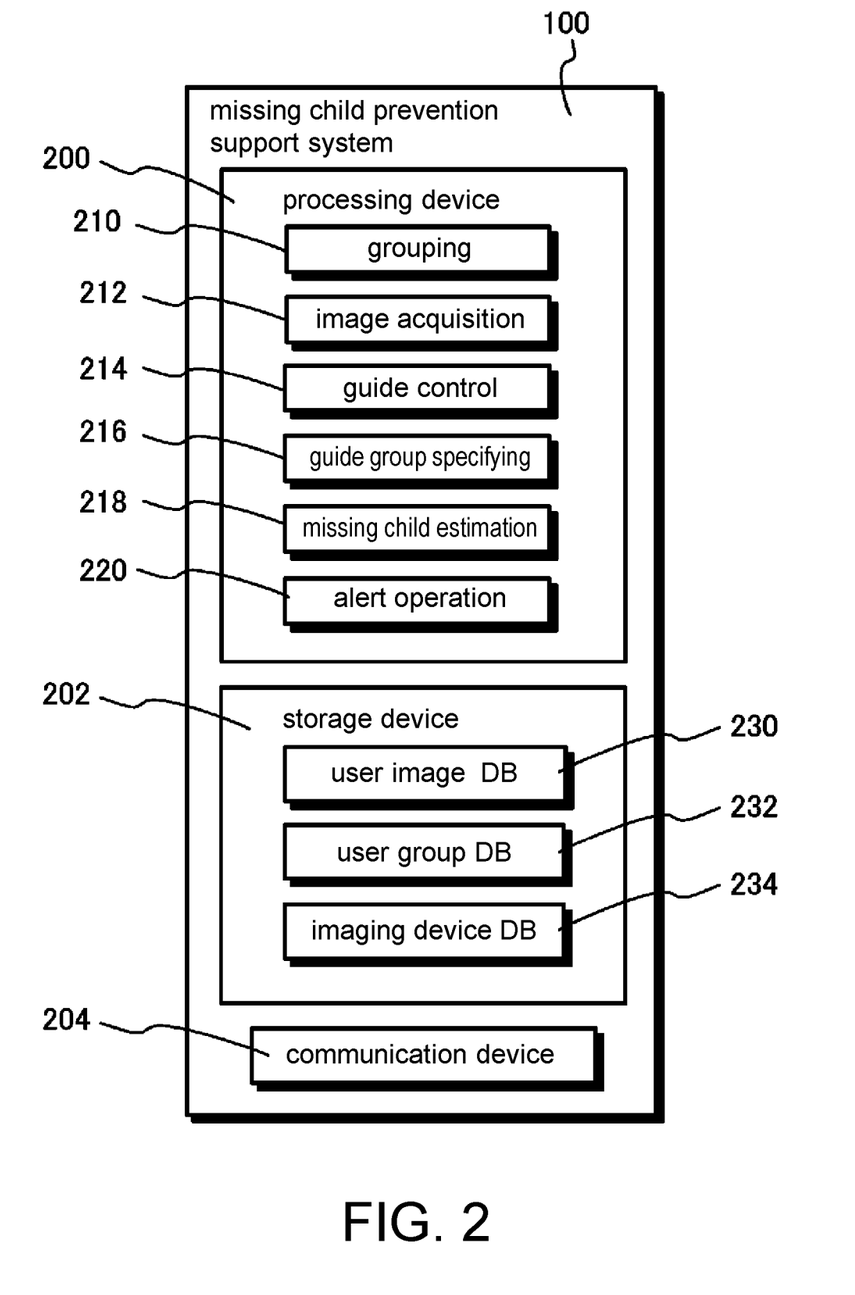
FIG. 2 is a diagram illustrating an example of a configuration of a missing child prevention support system according to the disclosure.

Next, a configuration of the missing child prevention support system 100 will be described. FIG. 2 is a diagram illustrating an example of a configuration of a missing child prevention support system 100. The missing child prevention support system 100 includes a processing device 200, a storage device 202, and a communication device 204. The storage device 202 includes, for example, a volatile semiconductor memory, a nonvolatile semiconductor memory, and/or a hard disk device and stores data and/or a program necessary for an operation of the processing device 200.

For example, the storage device 202 stores a user image database (user image DB) 230, a user group database (user group DB) 232, and an imaging device database (imaging device DB) 234. The user image DB 230 stores facial images of the users captured by the imaging devices 130, 140, 150, and the like. The user group DB 232 is configured as a user group record generated by a grouping part 210 to be described below. The imaging device DB 234 stores information regarding the disposition position of the imaging device 130 and the like provided in the facility 104 and the disposition position of the reception device 110 including the imaging device 140 in the facility 104. Here, the imaging device DB 234 is stored in advance in the storage device 202.

The communication device 204 includes a transceiver that connects the processing device 200 to the security device 109 to be able to communicate via the network 102. The communication device 204 includes a transceiver that indirectly connects the processing device 200 via the security device 109 and/or the network 102 or directly connects the processing device 200 without the involvement of the security device 109 and the network 102 to be able to communicate with the reception device 110, the guiding device 120 and the like, and the imaging devices 130, 140, 150, and the like.

The processing device 200 is, for example, a computer that includes a processor such as a central processing unit (CPU). The processing device 200 may include a read-only memory (ROM) on which a program is written and a random access memory (RAM) that temporarily stores data. The processing device 200 includes a grouping part 210, an image acquisition part 212, a guide control part 214, a guide group specifying part 216, a missing child estimation part 218, and an alert operation part 220 as functional elements or functional parts.

The functional elements included in the processing device 200 are realized, for example, by causing the processing device 200 which is a computer to execute a program. The computer program can be stored in any computer-readable storage medium. Instead of this, some or all of the functional elements included in the processing device 200 can also be configured by hardware including one or more electronic circuit components.

The grouping part 210 recognizes the user group 160 and the like of the user 162 and the like who are facility users entering the facility 104, generates a user group record which is user group information indicating the user group, and stores the user group record in the user group DB 232 stored by the storage device 202. It is assumed that the user group record which is user group information includes at least identification information including information regarding a facial image of each user who is a member of the user group. Here, the information regarding the facial image can be an address of a storage location at which facial image data is stored in addition to the facial image data. A specific example of a configuration of the user group record according to the embodiment will be described below with reference to FIG. 4.

For example, the grouping part 210 controls the reception device 110 and/or the guiding device 120 and the like in cooperation with the guide control part 214 such that a predetermined talk with the user 162 and the like entering the facility 104 is performed. The grouping part 210 acquires a talk voice of the talk via the reception device 110 and/or the guiding device 120 and the like. Then, the grouping part 210 specifies the user group 160 and the like of the user 162 and the like based on talk analysis of the acquired talk voice and generates the user group record. At this time, the grouping part 210 acquires a facial image of each user 162 and the like who form the specified user group 160 and the like using the imaging device 140 and/or 150 and the like included in the reception device 110 and/or the guiding device 120 and the like.

Instead of or in addition to this, the grouping part 210 can also acquire the facility images obtained by imaging the user 162 and the like entering the facility 104 from the imaging devices 130, 140, 150, and the like, detect the group of the user 162 and the like talking with one another or the group of the user 162 and the like acting as a party from the facility images, and specify the detected group as the user group 160 or the like. In this case, the grouping part 210 can acquire the facial images of the user 162 and the like who form the user group 160 or the like from the facility images used to specify the user group 160 or the like.

In the embodiment, for example, the grouping part 210 stores the acquired facial images of the user 162 and the like along with a group identification ID for identifying the user group 160 and the like to which the user 162 and the like belong in the user image DB 230 stored in the storage device 202. Then, the grouping part 210 includes storage addresses of the facial images of the user 162 and the like in the user image DB 230 in the user group record for the user group 160 and the like corresponding to the user 162 and the like.

The image acquisition part 212 acquires the images in the facility 104 (the facility images) including images of the user 162 and the like from the imaging devices 130, 140, 150 and the like which are in the facility 104, for example, at predetermined time intervals. The image acquisition part 212 outputs the acquired facility images to the missing child estimation part 218 along with imaging device IDs for identifying the imaging devices 130, 140, 150 and the like which are acquisition destinations.

The guide control part 214 controls an operation of the reception device 110 and an operation of the movable guiding device 120 and the like that guide the user 162 and the like in the facility 104. For example, the guide control part 214 causes the reception device 110 and/or the guiding device 120 and the like to perform talking (conversion) with the user 162 or the like in response to an instruction from the grouping part 210. In this talk, content of speech performed by the reception device 110 and/or the guiding device 120 and the like can be determined in advance. Then, the guide control part 214 acquires a talk voice in the talk from the reception device 110 and/or the guiding device 120 and the like and outputs the talk voice to the grouping part 210.

The guide control part 214 acquires, for example, a voice instruction for the user 162 and the like to request the guiding device 120 and the like to guide the facility 104 via the guiding device 120 and the like. Then, the guide control part 214 controls the guiding device receiving the voice instruction among the guiding device 120 and the like and cause the guiding device to perform a guiding operation in accordance with the voice instruction. Instead of or in addition to this, the guide control part 214 acquires a voice instruction for the user 162 and the like to request the reception device 110 and the like to guide the facility 104 via the reception device 110. Then, the guide control part 214 controls any of the guiding device 120 and the like, dispatches the guiding device to the user 162 and the like performing the voice instruction, and causes the guiding device to perform a guiding operation in accordance with the voice instruction.

Here, the guide control part 214 causes the guiding device 120 and the like to perform the guiding operation based on the voice instruction from the user 162 and the like, the guide control part 214 can acquire the facial images of the user 162 and the like performing the voice instruction from the imaging device 140 of the reception device 110 and/or the imaging device 150 and the like of the guiding device 120 and transmit the facial images to the guide group specifying part 216.

The guide group specifying part 216 specifies the user group of the user guided by the guiding device 120 and the like among the user 162 and the like as a guide group. For example, the guide group specifying part 216 acquires the facility images via the image acquisition part 212 and recognizes the user 162 and the like moving with each of the guiding device 120 and the like. Then, the guide group specifying part 216 inquires of the user image DB 230 about the facial images of the recognized user 162 or the like and specifies the user group 160 or the like to which the user belongs as the guide group.

Instead of or in addition to this, the guide group specifying part 216 may acquire the facial images of the user 162 and the like performing the voice instruction to request a guide from the guide control part 214, inquire of the user image DB 230 about the acquired facial images, and specify the user group 160 or the like to which the user belongs to as a guide group.

The guide group specifying part 216 sets a guide flag including in the user group record of the user group corresponding to the guide group to 1 when guide group specifying part 216 specifies the guide group. Thus, it is indicated that the user group indicated by the user group record is specified as the guide group.

When the guiding operation of the guiding device 120 and the like for the user 162 and the like ends, the guide group specifying part 216 resets the guide flag of the user group record corresponding to the user 162 and the like related to the guiding operation to 0 (zero). For example, when the guiding device 120 and the like end a current guiding operation, the imaging device 150 and the like acquire the facial images of the user 162 and the like within a predetermined distance range from the guiding device 120 and the like and transmit the acquired facial images to the guide group specifying part 216. The guide group specifying part 216 receives the facial images, inquires of the user image DB 230, and acquires the group identification ID of the user group to which the user 162 and the like of the facial images belong. Then, the guide group specifying part 216 resets the guide flag of the user group record that has the acquired group identification ID.

Figure 4:
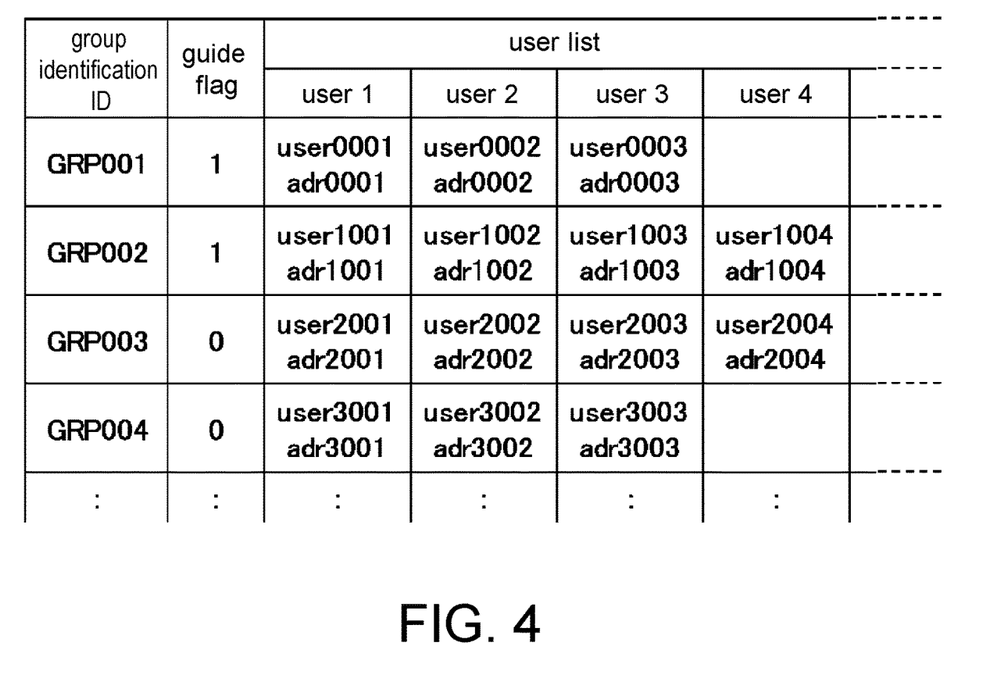
FIG. 4 is a diagram illustrating an example of a configuration of a user group database (DB) in the missing child prevention support system according to the disclosure.

FIG. 4 is a diagram illustrating an example of a configuration of the user group DB 232 (accordingly, a configuration of the user group record). The illustrated user group DB 232 is configured in, for example, a table format and each row is a user group record indicating each user group. Each user group record includes a group identification ID, a guide flag, and a user list of the users who form the user groups in order from the leftmost column.

The group identification ID is a unique code for identifying a user group corresponding to the user group record indicated in the row. The group identification ID is generated and added by the grouping part 210 when the grouping part 210 specifies the user group and generates the user group record.

The guide flag is a flag indicting whether the user group is a user group currently guided by the guiding device 120 or the like. When the guide flag is set to 1, the user group is a guide group currently guided by the guiding device 120 or the like, and the guide flag is reset to 0, the user group is a user group which is currently not guided by the guiding device 120 or the like.

The guide flag is reset to 0 as the default when the grouping part 210 generates the user group record. Thereafter, the guide flag is set or reset when the guide group specifying part 216 performs the above-described operation.

The user list includes, for example, a plurality of columns. In each column, user identification data of each of the user 162 and the like who form the corresponding user group 160 and the like is stored. In the example of FIG. 4, the user identification data includes, for example, user identification information of the user (data indicated by a reference sign beginning with "user" in FIG. 4) and a starting address (data denoted by a reference sign beginning with "adr" in FIG. 4) of a storage portion of the user image DB 230 in which the facial image of the user is stored. The user identification information may be configured as information indicating a name, an age, or the like of the user or may be an address of the storage portion in the storage device 202 in which the information is stored.

When an unguided user who is a user not belonging to a user group (that is, a guide group) guided by the guiding device 120 and the like among the user 162 and the like is shown in the images of the facility 104, the missing child estimation part 218 estimates the unguided user as a potential missing child with reference to FIG. 2.

Specifically, the missing child estimation part 218 acquires the facility images captured by the imaging devices 130, 140, 150, and the like at predetermined time intervals via the image acquisition part 212 and extracts the facial image of each of the user 162 and the like shown in the acquired facility images. Then, the missing child estimation part 218 sets the user group record of which the guide flag is 0 or 1 as a target among the user group records stored in the user group DB 232 and determines whether there is a user group in which the user 162 and the like of the facial image matching the extracted facial image are members.

When the facial image matching the extracted facial image is found in the user group record of which the guide flag is 0 or the facial image matching the extracted facial image is not found in the user group record of which the guide flag is 1, the missing child estimation part 218 determines that the user 162 or the like corresponding to the facial image is an unguided user.

Whether the determination process is performed by setting the user group records of which the guide flag is 0 or 1 as a target can be determined according to whether the number of user group records is small.

Here, it is not necessary for the missing child estimation part 218 to determine whether the user 162 and the like to be shown in the acquired facility images are unguided users whenever the facility images are acquired. For example, when the facility images are acquired at predetermined time intervals and the user 162 and the like which have not been shown in the previously acquired facility images are newly shown, the missing child estimation part 218 can determine whether the newly shown user 162 and the like are unguided users. Thus, it can be determined necessarily once whether all the user 162 and the like shown in the facility images are unguided users.

The missing child estimation part 218 outputs, for example, a facial image of an unguided user specified as a potential missing child, the facility images in which the unguided user is shown, and the identification information of the imaging devices 130, 140, 150, and the like capturing the facility images to the alert operation part 220.

When the facial images of the unguided user, the facility images, and positional information of the imaging devices are output from the missing child estimation part 218, the alert operation part 220 specifies the position of the unguided user based on the facility images or the positions of the imaging devices imaging the unguided user.

Here, for example, the positions of the imaging devices acquiring the facility images in which the unguided user is shown can be specified from strengths of radio waves coming from, for example, the signal transmission devices (not illustrated) distributed and disposed in the facility 104 and received in the guiding device 120 and the like, as described above, for example, when the imaging devices are the imaging device 150 and the like of the guiding device 120 and the like. Alternatively, when the imaging devices are the imaging device 130 and the like or 140, the positions of the imaging devices can be acquired from the imaging device DB 234 stored in the storage device 202.

The alert operation part 220 performs an alert operation in accordance with the specified positions. For example, the alert operation part 220 sets an alert level in accordance with the specified positions and outputs the alert information including information regarding the alert level.

Here, the alert information can include information regarding the positions and the facial images of the unguided users. For example, as described above, the alert level can be set to "1" when the specified position is within an area with good visibility such as a lobby or the like of a hotel. The alert level can be set to "2" when the specified position is within an area with poor visibility such as a store or the like in which there are many displayed items and there are many blind spots. The alert level can be set to "3" when the specified position is within a range of a predetermined distance from an entrance door 108 in which a user is likely to go out from the facility 104.

However, these are exemplary and the alert operation part 220 can set a less number of alert levels or a more number of alert levels in accordance with the position of the unguided user. Instead of or in addition to this, for example, the alert operation part 220 can perform another operation such as reporting to a security company (not illustrated) that manages the facility 104 or a locking instruction to a facility control device (not illustrated) that controls locking and unlocking of the entrance 106 or the entrance door 108 of the facility 104 in accordance with the position of the unguided user or can perform a different combination of the operations.

Figure 3:
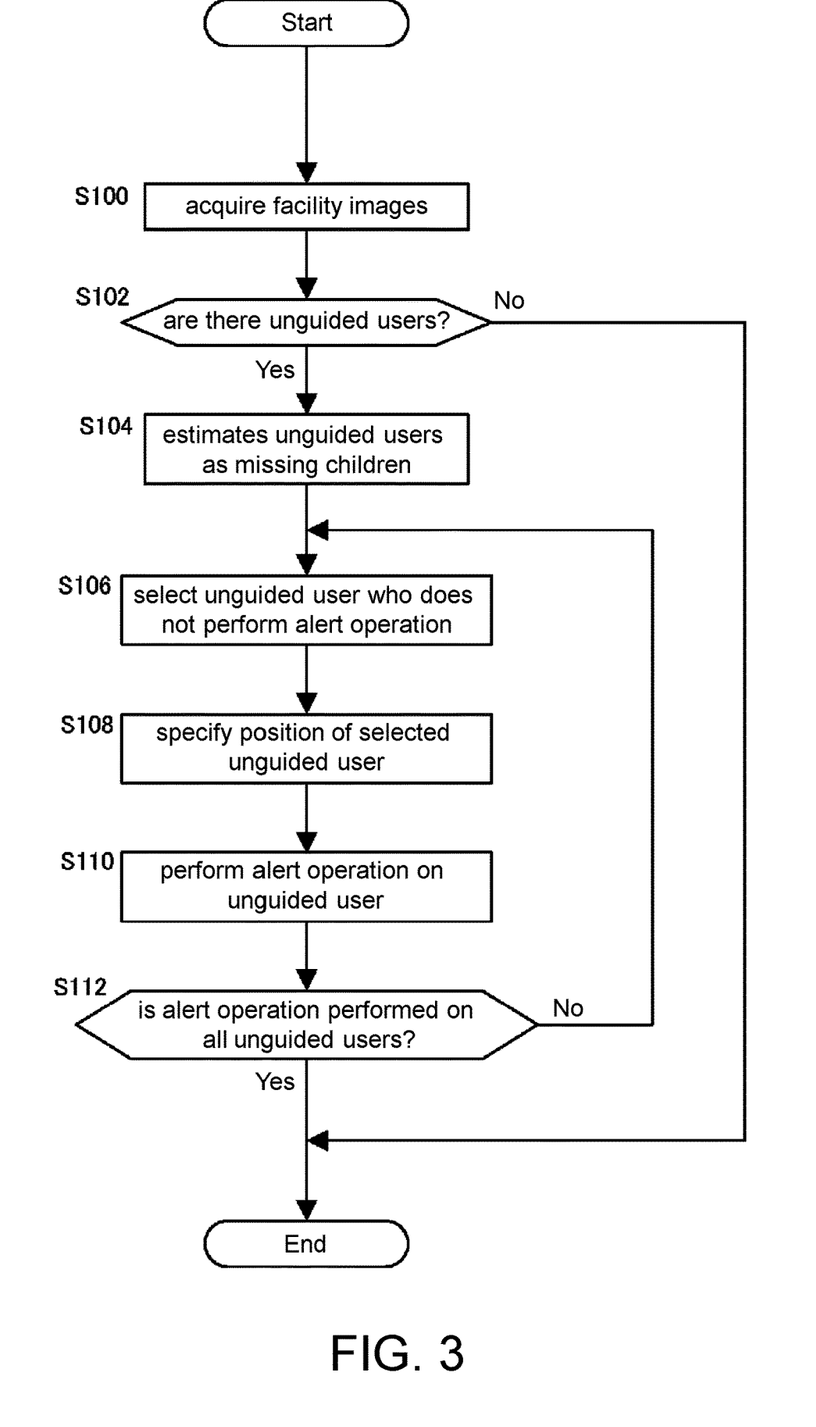
FIG. 3 is a flowchart illustrating a procedure of an operation of the missing child prevention support system according to the disclosure.

Next, an operation of the missing child prevention support system 100 will be described. FIG. 3 is a flowchart illustrating a procedure of an operation of the missing child prevention support system 100. The process illustrated in FIG. 3 is repeatedly performed, for example, at predetermined time intervals. Independently from or currently with the process illustrated in FIG. 3, in the missing child prevention support system 100, the grouping part 210 recognizes the group of the user 162 and the like in accordance with entrance of the user 162 and the like in the facility 104. Then, the grouping part 210 generates the user group record which is user group information indicating a user group and stores the user group record in the user group DB 232 of the storage device 202. Independently from or currently with the process illustrated in FIG. 3, in the missing child prevention support system 100, the guide control part 214 controls the operations of the guiding devices 120, 122, and 124 and the guide group specifying part 216 specifies the guide group which is a user group guided by the guiding device 120 or the like and sets a guide flag of the user group record corresponding to the guide group.

When the process illustrated in FIG. 3 starts, the image acquisition part 212 in the missing child prevention support system 100 first acquires images (facility images) in the facility 104 from the imaging devices 130, 140, 150, and the like (S100). Subsequently, the missing child estimation part 218 determines whether the unguided users are shown in the acquired facility images (S102). When the unguided users are not shown in the acquired facility images (NO in S102), the missing child estimation part 218 ends the process. Conversely, when the unguided users are shown in the acquired facility images (YES in S102), the missing child estimation part 218 estimates the unguided users as potential missing children (S104).

Subsequently, the alert operation part 220 selects the unguided user on which the alert operation is not performed among the unguided users estimated as the missing children (S106) and specifies, for example, the position of the unguided user from the positions of the imaging devices 130, 140, 150, and the like capturing the facility images in which the selected unguided user is shown (S108). Subsequently, the alert operation part 220 performs the alert operation on the selected unguided user in accordance with the specified position (S110).

Subsequently, the alert operation part 220 determines whether to perform the alert operation on all the unguided users estimated as the missing children in step S104 (S112). When there is the unguided user on which the alert operation has not been performed (NO in S112), the alert operation part 220 returns the process to step S106 and repeats the process. Conversely, when the alert operation is performed on all the unguided users (YES in S112), the alert operation part 220 ends the process.

The disclosure is not limited to the configuration of the foregoing embodiment and can be realized in various aspects within the scope of the disclosure without departing from the gist of the disclosure.

For example, in the above-described embodiment, the missing child prevention support system 100 is configured as one device, for example, one server connected to the network 102, but the disclosure is not limited thereto. The missing child prevention support system 100 can be configured by a plurality of devices that has divided functions of the missing child prevention support system 100. For example, the missing child prevention support system 100 can be configured by a first device that includes a function of the grouping part 210 of the processing device 200, storage portions of the user image DB 230 and the user group DB 232 in the storage device 202, and a second device that has the other functions. The first device is disposed, for example, in the facility 104 and the first and second devices can be connected to be able to communicate with each other, for example, via the network 102 or without the involvement of the network 102.

For example, some of the functions of the missing child prevention support system 100 may be distributed and disposed in the reception device 110 and the guiding devices 120 and the like. For example, processing devices included in the reception device 110 and the guiding device 120 and the like may have a function of controlling the reception device 110 and a function of controlling the guiding device 120 and the like among the functions of the guide control part 214. Alternatively, the imaging devices 130, 140, 150, and the like may each include a processing device and a function of extracting the facial images of the user 162 and the like newly shown in the facility images among the functions of the missing child estimation part 218 may be realized in the processing device of each of the imaging devices 130, 140, 150, and the like.

In the embodiment, the missing child prevention support system 100 is disposed outside of the facility 104, but the disclosure is not limited. For example, the missing child prevention support system 100 may be disposed in the facility 104. The missing child prevention support system 100 may have the function of the security device 109.

As described above, the missing child prevention support system 100 according to the above-described embodiment includes the grouping part 210, the image acquisition part 212, the guide control part 214, the guide group specifying part 216, and the missing child estimation part 218. The grouping part 210 recognizes the group of the user 162 and the like who are facility users entering the facility 104 and generates the user group record which is user group information indicating the user group 160 and the like. The image acquisition part 212 acquires the facility images including the images of the user 162 and the like from the imaging devices 130, 140, 150, and the like in the facility 104. The guide control part 214 controls operations of the movable guiding device 120 and the like guiding the users in the facility 104. The guide group specifying part 216 specifies the user group 160 and the like of the users guided by the guiding device 120 and the like among the user 162 and the like. When the unguided users who are the users not belonging to the user group 160 and the like guided by the guiding device 120 and the like among the user 162 and the like are shown in the facility images, the missing child estimation part 218 estimates the unguided users as potential missing children.

In the foregoing configuration, potential missing children can be determined using only whether the unguided users are shown in the images of the facility 104 acquired from the imaging device 130 and the like as a reference without tracking all the user 162 and the like and extracting other characteristics or action information. Therefore, in the foregoing configuration, it is possible to efficiently detect persons which are likely to be missing children while considerably reducing a processing load of image processing or the like performed to detect the missing children.

The missing child prevention support system 100 includes the imaging device 150 and the like equipped in the movable guiding device 120 and the like as the imaging devices. In this configuration, since the guiding device 120 and the like acquire the images of the facility 104 while moving through guiding to the user group 160 and the like, it is possible to reduce a necessary number of imaging devices.

In the foregoing missing child prevention support system 100, the grouping part 210 generates the user group information based on talk analysis of talk voices with the users acquired from the reception device 110 talking with the user 162 and the like entering the facility 104 and talk analysis of talk voices between the guiding device and the user 162 and the like acquired from the guiding device 120 and the like. In this configuration, it is possible to efficiently classify users of an association of users who normally act as a party, such as a family or a traveler group, who have a predetermined relationship and efficiently generate the user group information.

The foregoing missing child prevention support system 100 includes the alert operation part 220 that performs the alert operation on the unguided users estimated as the potential missing children. The alert operation part 220 specifies the positions of the unguided users estimated as the potential missing children based on the images of the facility 104 acquired by the imaging device 130 and the like or the positions of the imaging device 130, 140, and 150 imaging the unguided users. Then, the alert operation part 220 performs the alert operation in accordance with the specified positions.

In this configuration, since the alert operation, for example, an operation of setting different alert levels, can be performed in accordance with the positions of the unguided users estimated as the missing children, the rapidity of a measure action such as ensuring of the missing children or the number of people can be adjusted in accordance with the positions of the unguided users. Thus, it is possible to efficiently perform the measure action. For example, for an unguided user found at a position at which the unguided user is likely to move to a location at which it is difficult to find the unguided user (for example, near the entrance door 108 of the facility 104), it is possible to employ a more number of users than the number of unguided users found in a place with good visibility of the facility 104 and ensure the location more quickly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A missing child prevention support system comprising:
   a grouping part, configured to recognize a group of users who are facility users entering a facility and generate a user group information indicating a user group;
   an image acquisition part, configured to acquire facility images including images of the users from imaging devices of the facility;
   a guide control part, configured to control an operation of a movable guiding device performing a guiding for the users in the facility, wherein the movable guiding device performs the guiding operation in accordance with a voice instruction acquired by the guide control part;
   a guide grouping specifying part, configured to specify the user group of the users for which the guiding device performs the guiding, wherein the guide grouping specifying part inquires a user image database about facial images of the recognized user, specifies the user group to which the user belongs to as a guide group, and sets a guide flag including in the user group record of the user group corresponding to the guide group to 1 when the guide grouping specifying part specifies the guide group; and
   a missing child estimation part, configured to estimate an unguided user who is a user not belonging to the user group as a potential missing child, when the unguided user is shown in the facility images.

2. The missing child prevention support system according to claim 1, wherein
   the imaging devices include an imaging device with which the guiding device is equipped.

3. The missing child prevention support system according to claim 2, wherein
   the grouping part is configured to generate the user group information based on talk analysis of talk voices with the users acquired from a reception device talking with the users entering the facility and talk analysis of talk voices between the guiding device and the users acquired from the guiding device.

4. The missing child prevention support system according to claim 3, further comprising:
   an alert operation part, configured to specify a position of the unguided user who is estimated as the potential missing child based on the facility images or positions of the imaging devices imaging the unguided user and perform an alert operation in accordance with the specified position.

5. The missing child prevention support system according to claim 2, further comprising:
   an alert operation part, configured to specify a position of the unguided user who is estimated as the potential missing child based on the facility images or positions of the imaging devices imaging the unguided user and perform an alert operation in accordance with the specified position.

6. The missing child prevention support system according to claim 1, wherein
   the grouping part is configured to generate the user group information based on talk analysis of talk voices with the users acquired from a reception device talking with the users entering the facility and talk analysis of talk voices between the guiding device and the users acquired from the guiding device.

7. The missing child prevention support system according to claim 6, further comprising:
   an alert operation part, configured to specify a position of the unguided user who is estimated as the potential missing child based on the facility images or positions of the imaging devices imaging the unguided user and perform an alert operation in accordance with the specified position.

8. The missing child prevention support system according to claim 1, further comprising:
   an alert operation part, configured to specify a position of the unguided user who is estimated as the potential missing child based on the facility images or positions of the imaging devices imaging the unguided user and perform an alert operation in accordance with the specified position.

* * * * *